Figure 3:
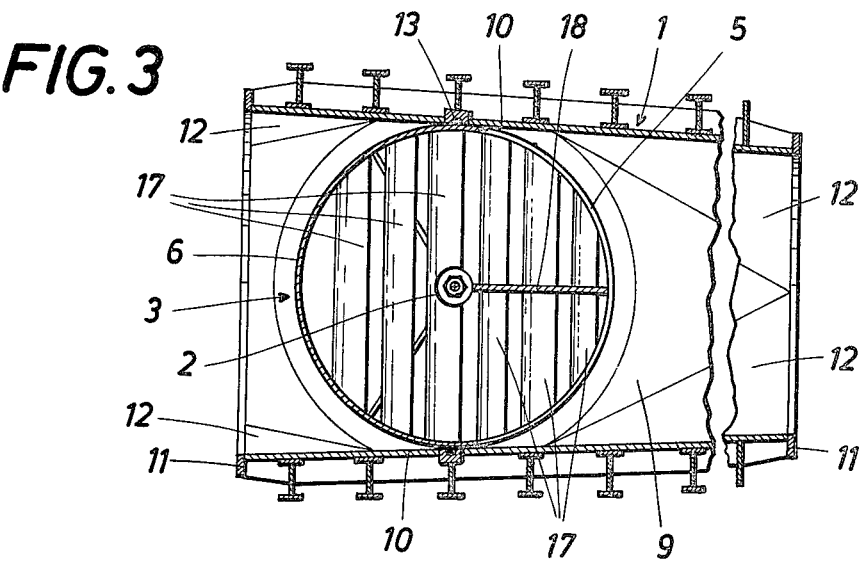

United States Patent [19]

Lukesch

[11] 4,266,575

[45] May 12, 1981

[54] DIRECTIONAL VALVE

[75] Inventor: Norbert Lukesch, Linz, Austria

[73] Assignee: Voest-Alpine Aktiengesellschaft, Linz, Austria

[21] Appl. No.: 32,534

[22] Filed: Apr. 23, 1979

[30] Foreign Application Priority Data

Jun. 5, 1978 [AT] Austria .................................. 4051/78

[51] Int. Cl.³ .......................... F16K 11/02; F17D 3/00
[52] U.S. Cl. ................................. 137/872; 98/41 AV;
137/885; 251/62; 251/325
[58] Field of Search ............ 138/39; 98/41 R, 41 AV,
98/41 SU; 251/62, 127, 324, 325; 137/625.48,
872, 874, 875, 885

[56] References Cited

U.S. PATENT DOCUMENTS

| | | | |
|---|---|---|---|
| 1,982,747 | 12/1934 | Kurth | 98/41 AV |
| 2,125,454 | 8/1938 | Marshall | 98/41 R |
| 2,271,010 | 1/1942 | Honerkamp | 98/41 AV |
| 2,273,818 | 2/1942 | Childers et al. | 98/41 R |
| 2,889,117 | 6/1959 | Wimpress | 137/875 |
| 2,993,513 | 7/1961 | Hyde | 251/127 |
| 3,089,515 | 5/1963 | Bochan | 137/874 |
| 3,089,677 | 5/1963 | Savaria | 251/325 |
| 3,105,520 | 10/1963 | Lorett et al. | 138/39 |
| 3,132,669 | 5/1964 | Feldsted | 137/874 |
| 3,190,584 | 6/1965 | Gire et al. | 137/875 |
| 3,270,775 | 9/1966 | Alderson | 137/875 |
| 3,463,193 | 8/1969 | Yost | 137/625.48 |
| 3,605,811 | 9/1971 | Lovell | 137/875 |
| 3,771,561 | 11/1973 | Santamaria, Jr. | 137/625.48 |
| 3,805,833 | 4/1974 | Teed | 137/872 |

Primary Examiner—Martin P. Schwadron
Assistant Examiner—G. L. Walton
Attorney, Agent, or Firm—Kurt Kelman

[57] ABSTRACT

A valve housing has a circular cylindrical tubular member and a tubular body having a central portion which is substantially rectangular in cross-section and has mutually opposite, first and second side walls. The first side wall has in cross-section a length equal to the diameter of said tubular member, which is joined to said first side wall and extends at right angles thereto. A motor-operable valve member is axially slidably mounted in said tubular member and comprises a laterally open shell, which consists of a part of a circular cylinder and is coaxial to said tubular member and substantially defined by that cross-sectional plane of said central portion which includes the axis of said tubular member, a circular ring at the end remote from said second side wall, and an end wall at the end opposite to said circular ring.

6 Claims, 4 Drawing Figures

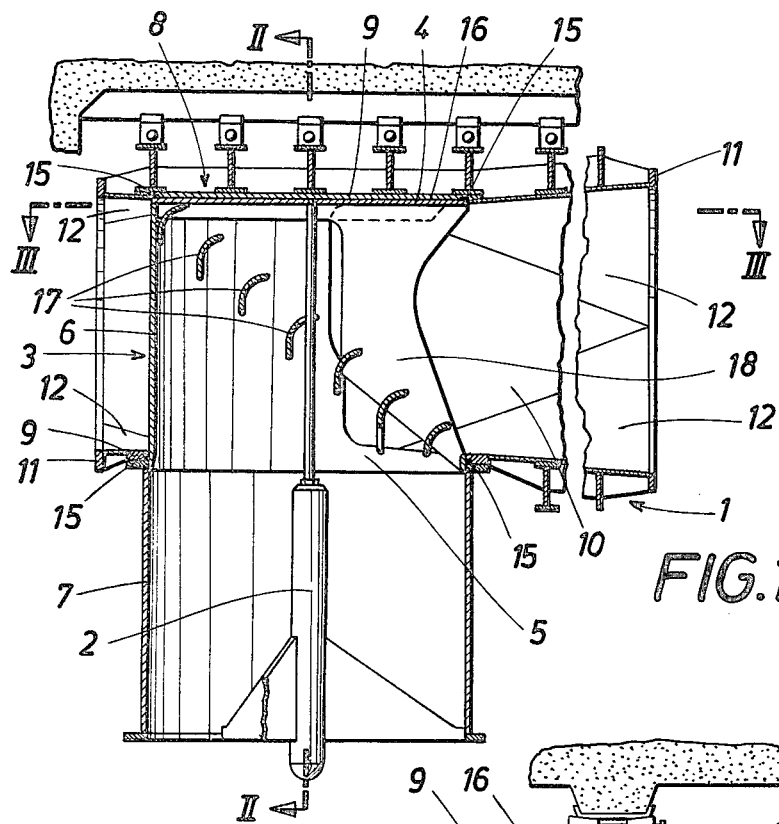
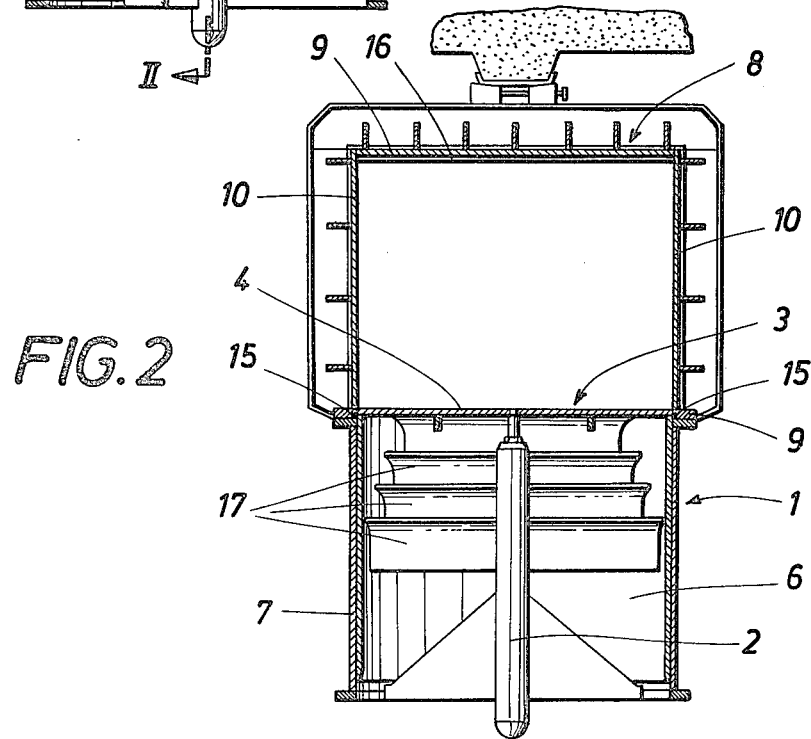

DIRECTIONAL VALVE

This invention relates to a directional valve for connecting a pressure pipeline to a pump discharge pipe, which extends at right angles to the pressure pipeline. The valve comprises a housing and a valve member which is adjustable in the housing by a motor.

When it is desired to connect, e.g., a discharge pipe of an auxiliary pump to the low-pressure pipe of a pump-or-turbine unit, which can be selectively used as a pump or as a turbine, a directional valve will be required which ensures that water can flow in the low-pressure pipe of the pump-or-turbine unit to the tail water with a minimum of energy loss and water can be supplied from the auxiliary pump to the pump-or-turbine unit in that that branch of the low-pressure pipe which leads from the discharge pipe of the auxiliary pump to the tail water is closed and the auxiliary pump discharge pipe connected to the valve is opened. In that case the resistance to flow obviously should be minimized too and that branch of the low-pressure pipe which leads to the tail water must be sealed tightly.

It is an object of the invention to provide a directional valve which serves to connect a pressure pipeline to a pump discharge pipe, which extends at right angles to the pressure pipeline, which valve is structurally simple and can make the desired connections so that the resistance to flow is minimized.

This object is accomplished according to the invention in that the housing comprises a tubular body, which is adapted to be incorporated in the pressure pipe and which has a central portion that is substantially rectangular in cross-section, and a tubular member, which has the shape of a circular cylinder and is joined to a wall of said central portion and extends at right angles thereto and is adapted to be connected to the pump discharge pipe and equal in diameter to the cross-sectional length of said wall, and the valve member is slidably guided in said tubular member and comprises a coaxial shell, which consists of a part of a circular cylinder and is defined substantially by that transverse sectional plane of the central portion which extends through the axis of said tubular member, and further comprises a circular ring at the end remote from said central portion and a circular end wall at the end opposite to said circular ring.

As the valve member is designed to be open toward the pump and has a flow passage facing one branch of the pressure pipeline, the valve member defines a communicating passage between the pump discharge pipe and one branch of the pressure pipeline. The other branch of the pressure pipeline can be closed by the shell of the valve member in one control position. Because the central portion is substantially rectangular in cross-section, the shell of the valve member and the adjacent walls of the central portion contact each other along continuous lines so that in that control position the valve member can be effectively sealed against the central portion by suitable sealing elements. In this control position of the valve member, its end wall contacts the opposite wall of the central portion and a seal on all sides will not be obtained unless said end wall of the valve member is sealed against said opposite wall of the central portion and the circular ring is sealed against the associated wall of the central portion by sealing elements which adjoin the sealing elements that extend in the direction of the generatrices of the shell.

When the valve member has been pulled out of the central portion, the end wall of the valve member closes the passage opening between the tubular member and the central portion so that during turbine operation the conditions in the pressure pipeline serving as a low-pressure pipe will be substantially undisturbed. This is due to the fact that the flat end wall of the valve member is now flush with the wall of the central portion and the resulting smooth wall surfaces ensure favorable flow conditions.

According to a preferred further feature of the invention, the wall which is opposite to the circular cylindrical tubular member has a recess for receiving the end wall of the valve member. This provides for an additional support of the valve member on that opposite wall so that the pressure applied can be transmitted to the housing in a simple manner. That arrangement also ensures that the position of the valve member in which the discharge pipe from the auxiliary pump is connected to the pressure pipeline will be exactly defined so that an effective seal of the valve member against the housing is ensured.

To ensure that this recess will not substantially increase the resistance to flow, the depth of the recess should be only small. Particularly desirable conditions will be obtained if the depth of the recess equals the thickness of the end wall because in such case the inside surface of the end wall is aligned with the inside surface of the corresponding wall of the central portion. Because the discharge pressure of the auxiliary pump applies an axial load to the valve member, the end wall is automatically forced firmly into the recess so that a reliable seal in that area is ensured.

Suitable guide vanes may be provided to ensure favorable flow conditions when the flow from the auxiliary pump discharge pipe is diverted to the pressure pipeline. Such guide vanes must be firmly connected to the valve member. For that purpose, a preferred further feature of the invention resides in that the valve member comprises at least one supporting plate, which extends in or parallel to a plane that includes the axes of the central portion and the tubular member, and guide vanes which are carried by said supporting plate and extend at right angles thereto. Such guide vanes present hardly any additional resistance to flow because they lie in the direction of flow.

For a satisfactory function of the directional valve, the valve member must be in the proper angular position because only in that case can one branch of the pressure pipeline be shut off and desirable conditions of flow be ensured. For this reason the valve member must be held against rotation. A particularly desirable design will be obtained if the valve member has radially protruding guide pins, which engage a groove that extends in the direction of sliding movement of the valve member. In order to eliminate the need for threading the valve member with its guide pins into the housing, the guide pins can be screwed into the valve member through bores which are formed in the housing and can subsequently be closed.

Figure 4:
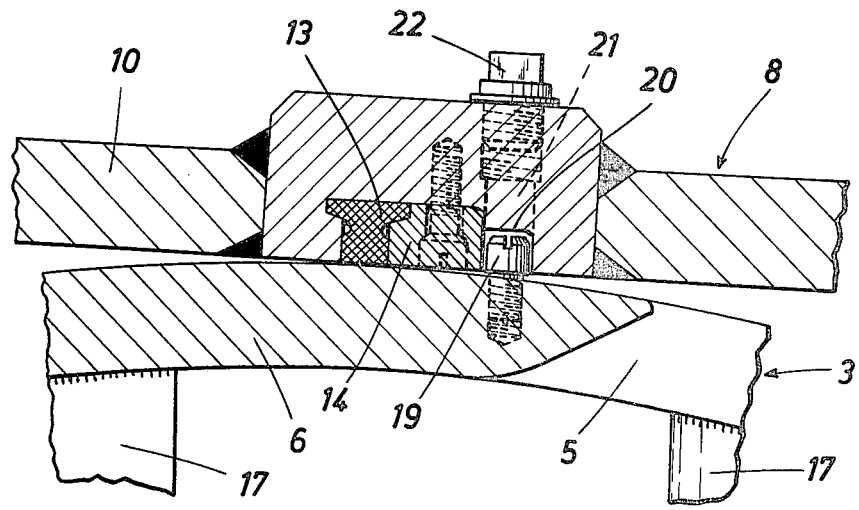

An embodiment of the invention is shown diagrammatically and by way of example on the accompanying drawing, in which FIG. 1 is an axial sectional view showing a directional valve according to the invention, FIG. 2 is a sectional view taken on line II—II in FIG. 1, FIG. 3 is a sectional view taken on line III—III in FIG. 1, and FIG. 4 is an enlarged sectional view taken in the region of the seal between the valve housing and valve member.

The directional valve which is shown in the drawings comprises a housing 1 and a valve member 3 which is adjustable in the housing 1 by a servomotor 2. The valve member 3 consists of an end wall 4 at one end, a circular ring 5 at the other end, and a laterally open shell 6 between the end wall 4 and the circular ring 5. The valve member 3 is inserted into a tubular member 7, which forms part of the housing 1 and is connected to a discharge pipe, which comes from a pump. The tubular member 7 is connected to a central portion 8 of a tubular body which together with the tubular member 7 constitutes the housing 1. That central portion 8 comprises end walls 9 and side walls 10 which form a body having a rectangular cross-section. Transitional portions 12 are provided with circular flanges 11 for connection to a continuous pressure pipeline.

Because the tubular member 7 extends at right angles to that end wall 9 of the central portion 8 to which the member 7 is connected and the diameter of the tubular member 7 equals the length of that wall 9 extending between two opposite side walls 10, as is apparent from FIGS. 2 and 3, the shell 6 of the valve member 3 contacts the side walls 10 of the central portion 8 along two diametrically opposite lines and can be sealed against the walls 10 of the central portion 8 by suitable sealing elements 13 along these lines.

As is apparent from FIG. 4, these sealing elements 13 can be secured to the walls 10 in a simple manner by means of retaining bars 14.

For a complete seal, the valve member 3 obviously must be sealed against the walls 9 too. This is accomplished by peripheral annular sealing elements 15 which are mounted adjacent to the mouth at which the tubular member 7 joins the central portion 8 and adjacent to a recess 16 formed in the opposite wall 9 and having a depth which is equal to the thickness of the end wall 4 of the valve member 3. Under the pressure applied, the end wall 4 is forced into said recess when the valve member is in the control position shown in FIG. 1 so that the valve member 3 then actually ensures a tight seal of one branch of the pressure pipeline. This will obviously require that the central portion 8 is substantially rectangular in cross-section. When the valve member 3 has been retracted into the tubular member 7, the end wall 4 closes and is flush with the mouth at which the tubular member 7 joins the central portion 8, as is clearly apparent from FIG. 2. This ensures the free flow through the pressure pipeline connected to the flanges 11.

Guide vanes 17 are inserted into the valve member 3 in order to ensure favorable conditions of flow when the flow from the tubular member 7 is diverted into the pressure pipeline connected to the flanges 11. Because the shell 6 of the valve member is substantially limited by the cross-section of the central portion 8 in the plane which includes the axis of the tubular member 7—this is particularly apparent from FIGS. 3 and 4—the guide vanes 17 can be secured to the valve member 3 without additional means only adjacent to the shell. Outside the shell 6, the guide vanes 17 are mounted on a supporting plate 18 which is disposed between the end wall 4 and the circular ring 5 and lies in the section plane of FIG. 1 and is secured to the circular ring 5, which in the embodiment shown by way of example consists of a corresponding striplike extension of the shell.

To ensure that the valve member 3 will be held against rotation as it is displaced by means of the servomotor 2, the valve member 3 carries guide pins 19, which in accordance with FIG. 4 engage a mating groove 20 in the valve housing. Because it might be difficult to insert a valve member provided with such radially protruding guide pins into the housing, these guide pins 19 can be screwed into the valve member 3 through bores 21 in the valve housing. These bores 21 obviously must subsequently be covered by a closure 22.

What is claimed is:

1. A directional valve for selectively directing the flow of a liquid from only through a pressure pipeline and from a discharge pipeline into the pressure pipeline extending substantially perpendicularly thereto, which comprises (a) a valve housing connecting the pressure pipeline to the discharge pipeline, the housing including
  (1) a tubular body mounted in the pressure pipeline and having a central portion comprised of two end walls and two side walls interconnecting the end walls, the central portion being of substantially rectangular cross section and the end walls extending in the general direction of the pressure pipeline, and
  (2) a cylindrical body extending substantially perpendicularly to one of the end walls and having one end connected to the one end wall and an opposite end for connection to the discharge pipeline, the cylindrical body having a diameter corresponding to the length of the one end wall between the two side walls of the central portion, and (b) a motor-operable valve member axially slidably mounted for movement between the cylindrical body and the central portion, the valve member including
  (1) a partially cylindrical shell coaxial with the cylindrical body and being delimited substantially by a plane passing through the axis of the cylindrical body and shell perpendicularly to the side walls of the central portion,
  (2) an end wall at an end of the shell facing the central portion and substantially parallel to the end wall of the central portion opposite the one end wall thereof,
  (3) a ring having a diameter corresponding to that of the cylindrical body at the other end of the shell, and
  (4) the length of the shell between the end wall thereof and the ring being substantially equal to the distance between the end walls of the central portion and the shell contacting the side walls in said plane when the valve member is moved into the central portion, the valve member providing for communication between the pressure pipeline and the discharge pipeline in an axial position wherein the ring is substantially flush with the one end wall of the central portion, interrupting the communication between the pressure and discharge pipelines in an axial position wherein the end wall of the shell is substantially flush with the one end wall of the central portion and allowing communication only through the pressure pipeline.

2. The directional valve of claim 1, wherein the opposite end wall of the central portion defines a recess for receiving the end wall of the valve member.

3. The directional valve of claim 2, wherein the depth of the recess equals the thickness of the valve member end wall.

4. The directional valve of claim 1, further comprising a support plate disposed in a plane defined by the axes of the tubular and cylindrical bodies, and a series of guide vanes carried by the support plate and extending perpendicularly thereto and parallel to each other.

5. The directional valve of claim 1, wherein the valve housing defines a groove extending in the direction of the axis of the cylindrical body, and further comprising guide pins protruding radially from the shell of the valve member and engaging the groove.

6. The directional valve of claim 5, wherein the guide pins are screwed into the valve member shell, the valve housing defines bores permitting the insertion of the guide pins through the bores into the valve member shell, and further comprising detachable closures in the bores.

* * * * *